(12) United States Patent
Katsuyama et al.

(10) Patent No.: US 7,612,507 B2
(45) Date of Patent: Nov. 3, 2009

(54) MOTOR CONTROLLER

(75) Inventors: Kazuo Katsuyama, Chiba (JP); Hideo Kitazawa, Chiba (JP)

(73) Assignee: Futaba Corporation, Chiba-ken (JP)

( * ) Notice: Subject to any disclaimer, the term of this patent is extended or adjusted under 35 U.S.C. 154(b) by 100 days.

(21) Appl. No.: 11/867,295

(22) Filed: Oct. 4, 2007

(65) Prior Publication Data
US 2008/0088269 A1 Apr. 17, 2008

(30) Foreign Application Priority Data
Oct. 11, 2006 (JP) .............................. 2006-277364

(51) Int. Cl.
*G05D 1/02* (2006.01)

(52) U.S. Cl. .................. 318/16; 318/798; 318/811; 318/476

(58) Field of Classification Search .................. 318/16, 318/807, 811, 803, 599, 798, 802, 806, 476
See application file for complete search history.

(56) References Cited

U.S. PATENT DOCUMENTS

| | | | | |
|---|---|---|---|---|
| 3,569,969 A * | 3/1971 | Lemon, Jr. | .................. | 180/167 |
| 3,694,671 A * | 9/1972 | Coleman et al. | ............. | 327/483 |
| 3,720,281 A * | 3/1973 | Frownfelter | ................ | 180/167 |
| 3,732,570 A * | 5/1973 | Fiorentino | .................. | 340/825 |
| 3,800,902 A * | 4/1974 | Keller | ......................... | 180/167 |
| 3,856,104 A * | 12/1974 | Ohba | .......................... | 180/167 |
| 4,581,569 A * | 4/1986 | Fujioka et al. | .............. | 318/811 |
| 4,924,168 A * | 5/1990 | Horie et al. | ................. | 318/811 |
| 4,965,504 A * | 10/1990 | Ueda et al. | .................. | 318/802 |
| 4,986,092 A * | 1/1991 | Sood et al. | .................. | 68/12.01 |
| 5,134,347 A * | 7/1992 | Koleda | .......................... | 318/16 |
| 5,231,693 A * | 7/1993 | Backes et al. | ............... | 700/264 |
| 5,235,258 A * | 8/1993 | Schuerch | ...................... | 318/16 |
| 5,483,141 A | 1/1996 | Uesugi | | |
| 5,841,259 A * | 11/1998 | Kim et al. | .................... | 318/587 |
| 6,232,735 B1 * | 5/2001 | Baba et al. | .................. | 318/567 |
| 6,369,530 B2 * | 4/2002 | Kovach et al. | ................ | 318/16 |
| 6,442,979 B1 * | 9/2002 | Thorn et al. | ................ | 68/12.16 |
| 7,042,191 B2 * | 5/2006 | Hirono | ........................ | 318/801 |

FOREIGN PATENT DOCUMENTS

| | | |
|---|---|---|
| JP | 64-064504 | 10/1989 |
| JP | 6178579 A | 6/1994 |
| JP | 06-312065 | 11/1994 |
| JP | 11-150978 | 6/1999 |
| JP | 2000-051540 | 2/2000 |

* cited by examiner

*Primary Examiner*—Bentsu Ro
*Assistant Examiner*—Thai Dinh
(74) *Attorney, Agent, or Firm*—Quarles & Brady LLP

(57) ABSTRACT

A motor controller capable of appropriately change the drive control condition in response to variations generated in motor drive control. The receiving circuit wirelessly receives and demodulates the control signal to controllably drive the motor and then outputs the demodulated signal to the motor controller. The current detection circuit detects the drive signal for the motor. The CPU refers to a table including correlations between drive currents of the motor and drive frequencies, which are respectively stored in the memory. The CPU selects a drive frequency corresponding to a drive current detected by the current detection circuit, thus controllably driving the motor using the drive signal of the corresponding drive frequency.

5 Claims, 2 Drawing Sheets

MOTOR CONTROLLER

CROSS REFERENCE TO THE RELATED APPLICATION

This application claims the priority benefit of Japanese Patent Application No. 2006-277364 filed on Oct. 11, 2006.

STATEMENT REGARDING FEDERALLY SPONSORED RESEARCH

Not Applicable.

BACKGROUND OF THE INVENTION

1. Field of the Invention

The present invention relates to a motor controller for controlling rotation of a motor. More particularly, the present invention relates to a motor controller suitable for the remote radio control of a motor.

2. Description of the Prior Art

Conventionally, motor controllers for controlling motors mounted on controlled equipment in response to control signals transmitted from a transmitter have been developed in hobby and industrial fields.

In motor controllers used for hobby-level radio controllers, the drive frequency of the motor drive signal is generally set to a fixed value. In the recent year, motor controllers that can set the drive frequency to different values have been developed as disclosed in the Japanese Patent Publication No. 6-312065.

However, the motor controller disclosed in the Japanese Patent Publication No. 6-312065 is disadvantageous in that the drive frequency cannot be changed in the course of controlling a controlled unit of model car or model airplane. Thus, the controlled unit cannot be controlled and driven powerfully. Thus, suitable remote control cannot be established in accordance with environmental changes in, for example, a driving course.

In order to solve such a problem, there is proposed a motor controller disclosed in the Japanese Patent Publication No. 2000-51540. In this motor controller, the control lever of the transmitter is manipulated in such a way that the drive signal period is widened so as to set the duty cycle of the drive signal to a smaller value and that the drive signal period is narrowed so as to set the duty cycle of the drive signal to a larger value.

In the prior art, it is possible to achieve a smooth movement of the controlled unit by increasing drive frequency, and a powerful movement thereof by decreasing drive frequency. In this manner, desired remote control in accordance with environmental changes can be established in a certain limited range.

However, the motor controller disclosed in the Japanese Patent Publication No. 2000-51540 is disadvantageous in that the motor mounted on a controlled unit experiences an unexpected heavy load state, and the commutator may burn at lower drive frequencies, if the motor is a high power motor which can output a torque more than a predetermined value. On the other hand, the motor becomes non-powerful, if the motor is a low power motor which cannot output a torque more than a predetermined value, and is subjected to an unexpected heavy load and driven at higher frequencies.

Accordingly, the conventional motor controller is disadvantageous in that the drive control condition cannot be suitably changed when unexpected load change occurs during the motor drive control.

SUMMARY OF THE INVENTION

An object of the present invention provides a motor controller which is capable of suitably changing the drive control condition in response to variations in motor drive control. Moreover, the motor controller of the present invention can suppress the excessive current flowing through the motor.

According to the present invention, the motor controller comprises detection means for detecting a drive current for a motor and control means for controllably driving the motor by a drive current in response to a control signal for controlling and driving the motor. The control means sets the drive frequency of the drive signal into the drive frequency corresponding to the drive current for controlling and driving the motor.

The detection means detects the drive current for the motor. The control means sets the drive frequency of the drive signal into the drive frequency corresponding to the drive current for controlling and driving the motor.

The motor controller further comprises storage means for storing a table including correlations between drive currents and drive frequencies of the motor. The control means refers to the table and selects a drive frequency corresponding to a drive current detected by the detection means so as to control and drive the motor in accordance with a drive signal of the drive frequency. The control means increases the drive frequency of the drive signal to control and drive the motor, if the motor is a high-power motor and the drive current is more than a predetermined value. On the other hand, the control means decreases the drive frequency of the drive signal to controllably drive the motor, if the motor is a low-power motor and the drive current is more than a predetermined value. Furthermore, the control means determines the duty cycle of the drive current based on the control signal and a drive current detected by the detection means in such a way that the drive current does not become an excessive current. Thus, the control means controls and drives the motor using the drive current of the duty cycle. According to the present invention, the motor controller further comprises receiving means for wirelessly receiving and demodulating a modulated control signal and outputting a demodulated signal as a control signal. It is possible to change the drive control state properly according to variations in the course of controlling and driving the motor.

DETAILED DESCRIPTION OF THE INVENTION

Figure 1:
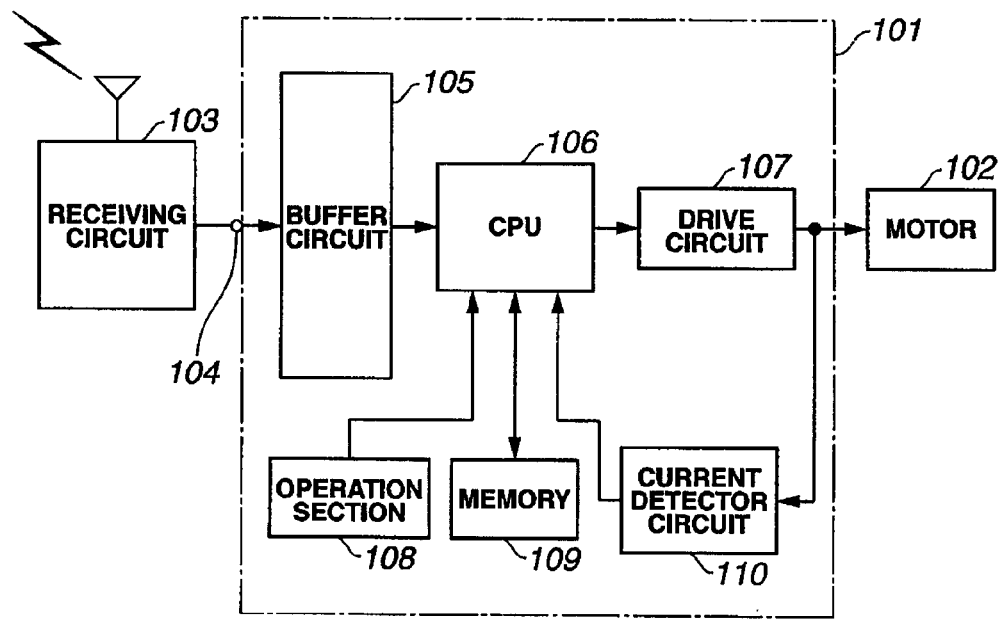
FIG. 1 is a block diagram illustrating a motor controller according to an embodiment of the present invention.

FIG. 1 is a block diagram illustrating a motor controller 101 used for a radio controller (hereinafter referred to as R/C) for hobbies according to the present invention. The motor controller 101 is mounted in controlled equipment (not shown) such as a model airplane, together with a receiving circuit 103. The motor controller 101 controls and drives the motor 102 which is mounted on the controlled equipment in response to control signals from a transmitter (not shown), and rotates predetermined mechanisms in the controlled equipment by the dc motor 102.

Referring to FIG. 1, the receiving circuit 103, the motor controller 101 and the motor 102 connected to an output of the motor controller 101 are mounted in the controlled equipment such as a model airplane or a model car. The receiving circuit 103 wirelessly receives and demodulates control signals, which are modulated to control and drive the motor 102, from the transmitter (not shown) and outputs the demodulated signal as the control signal for controlling and driving the motor 102 to the motor controller 101. The motor controller 101 includes a terminal 104, a buffer circuit 105, a central processing unit (CPU) 106, a drive circuit 107, and operation section 108, a memory 109, and a current detection circuit 110. The control signal includes information regarding control of the duty cycle of a drive signal for controlling and driving the motor 102. The receiving circuit 103 or the computer (not shown) is selectively connected to the terminal 104. In the control mode for controlling and driving the motor 102, the receiving circuit 103 is connected to the terminal 104.

In the setting mode for storing a table, which includes correlations between drive currents for the motor 102 and drive frequencies of drive signals, into the memory 109, the computer is connected to the terminal 104. The table is loaded from the computer. Under control of the CPU 106, the table is stored in the memory 109 via the buffer circuit 105. The control mode or the setting mode is selected by manually manipulating the operation section 108.

The buffer circuit 105 outputs the signal received via the terminal 104 to the CPU 106. The CPU 106 executes the program previously stored in the memory 109 and performs the process in the control mode or the setting mode selected in response to the operation of the operation section 108 in addition to the process to be described later. The drive circuit 107 controls and drives the motor 102 in accordance with the drive signal corresponding to the control signals from the CPU 106. The motor 102 is driven, rotated and controlled by the drive signal from the drive circuit 107. The operation section 108, which selects the control mode or the setting mode, is formed of switches which are operable externally. The memory 109 stores the program to be executed by the CPU 106, the table including correlations between drive currents of the motor 102 and drive frequencies of drive signals, data, and others. The current detection circuit 110 detects the drive current flowing through the motor 102. The receiving circuit 103 is formed as receiving means. The CPU 106 is formed as control means. The memory 109 is formed as storage means. The current detection circuit 110 is formed as detection means.

Figure 3:
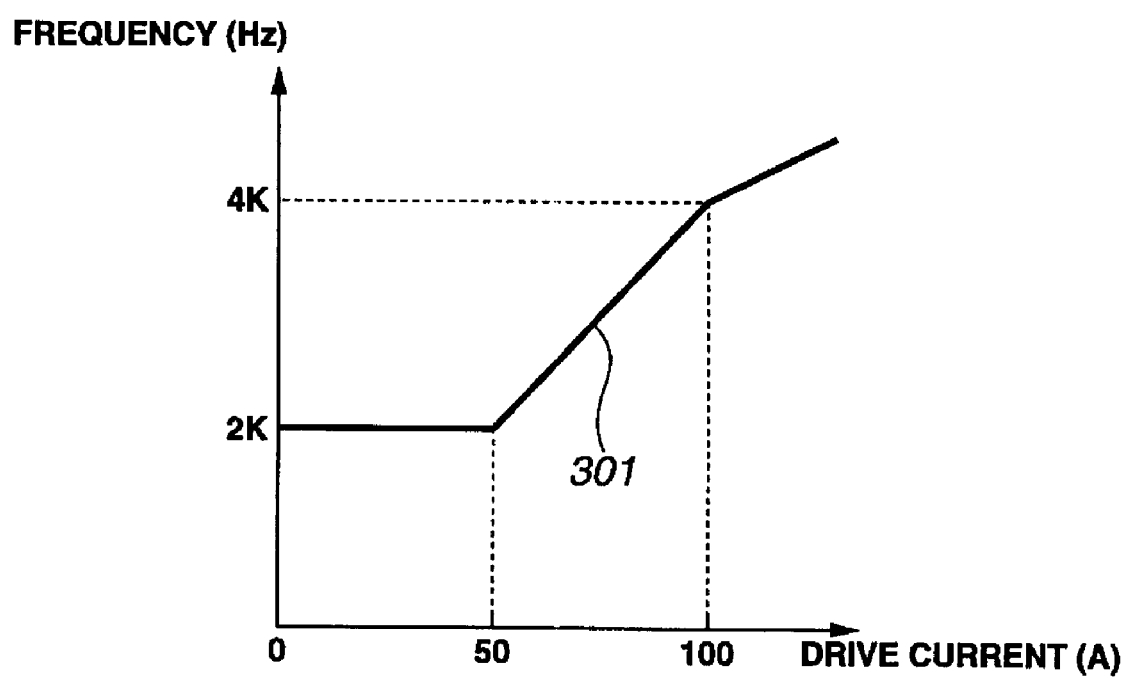
FIG. 3 is a characteristic diagram of the motor controller according to an embodiment of the present invention.

FIG. 3 is a characteristic diagram showing contents of the table stored in the memory 109, the table including correlations between drive currents of the motor 102 and drive frequencies of drive signals. FIG. 3 shows an example where the motor 102 is a high power motor. The line segment 301 showing relationships between drive currents and drive frequencies illustrates a broken line. That is, referring to FIG. 3, the drive frequency remains at 2 kHz over a range of 0 to 50 A of the drive current of the motor 102. The drive frequency varies linearly between 2 kHz to 4 kHz with a predetermined gradient over a range of 50 to 100 A of the drive current of the motor 102. The drive frequency varies linearly with a gradient (gentler than the area between 50 and 100 A) over a range of 100 A or more. In the setting mode, the characteristic data in FIG. 3 is stored into the memory 109 in form of a table to refer to and use in the control mode.

The high power motor is a motor in which the number of winding turns is less than 13 T (turns). The high power motor is the motor that can output a torque of a predetermined value or more. Also, the high power motor is a high power consumption motor intended for use in competition, and of which the commutator or brush experiences severe wear and deterioration.

The operation of the motor controller according to an embodiment of the present invention will be explained below by way of FIGS. 1 to 3. First, the operation of storing into the memory 109 a table including correlations between drive signals for the motor 102 and drive frequencies of drive signals will be explained. In this case, a computer is connected to the terminal 104 instead of the receiving circuit 103. The CPU 106 is set to the setting mode using the operation of the operation section 108.

In the setting mode, the computer transmits the table, which includes correlations between drive signals for the motor 102 and drive frequencies thereof, to the CPU 106 via the terminal 104 and the buffer circuit 105. The CPU 106 receives the table from the computer via the terminal 104 and the buffer circuit 105 and stores the table into the memory 109.

When the motor 102 is a high power motor, the table includes relationships between drive currents and drive frequencies, which are arranged to increase the drive frequency of a drive signal when the drive signal exceeds a predetermined value, namely in a high load. In this manner, the controlled equipment can be operated powerfully while the burning of the commutator in the motor 102 is suppressed. For example, when the controlled equipment is a car, powerful driving can be made while the burning of the commutator of the motor 102 is suppressed. In the embodiment as described above, the characteristics in FIG. 3 are stored into the memory 109 in form of a table.

When the motor 102 is a low power motor, a table is stored into the memory 109 in the setting mode, the table including correlations between drive signals and drive frequencies to decrease the drive frequency of a drive signal when the drive signal exceeds a predetermined value, namely in a high load. In the control mode, control is performed using the table. As described above, the memory 109 stores the table including correlations between drive currents and drive frequencies of the motor 102 to complete the setting mode.

It is to be understood that the low power motor corresponds to a motor having the number of winding turns of about 23 T. The low power motor is a motor that cannot output a torque of a predetermined value or more. The low power motor is chiefly used for a beginner or middle class player, which is low-power consumption, and less abrasion or deterioration of the commutator or brush. In the low power motor, smooth driving can be performed using the table described above while the controlled equipment is operating powerfully. For example, when the controlled equipment is a car, the low power motor makes smooth powerful running possible.

Next, the control mode of controlling and driving the controlled equipment, for example, the motor 102 will be explained. In the control mode, as shown in FIG. 1, the receiving circuit 13 is connected to the terminal 104 and the CPU 106 is set to the control mode by the operation of the operation section 108. In this state, the receiving circuit 103 is subjected to predetermined modulation and wirelessly receives a control signal of a duty cycle corresponding to the operation of the transmitter (not shown). Thereafter, the receiving circuit 103 demodulates the received control signal and then outputs the demodulated signal as a control signal to the CPU 106 via the terminal 104 and the buffer circuit 105.

The CPU 106 captures the control signal (step S201 in FIG. 2) and captures the drive current in a current drive state detected by the current detection circuit 110 (step S202 in FIG. 2) and refers to the table stored in the memory 109. In this manner, the CPU 106 sets the drive frequency of the drive signal to the drive frequency corresponding to the drive current (step S203 in FIG. 2).

When the motor 102 is the high power motor, driving the motor 102 with the drive signal described above allows the controlled equipment to operate powerfully, while burning of the commutator in the motor 102 is suppressed. Therefore, when the controlled equipment is a car, powerful running is possible while the burning of the commutator in the motor is suppressed.

When the motor 102 is the low power motor and the memory 109 stores a table including characteristics suitable to the low power motor, drive control is made by referring to the table. Thus, that drive control enables smooth operation while the controlled equipment is operating powerfully. Therefore, when the controlled equipment is a car, that drive control enables smooth running.

When the drive signal of the drive frequency determined as described above produces excess current in the motor 102, the CPU 106 changes the duty cycle determined by the control signal to be a predetermined value or less forcedly. In this manner, occurrence of the excess current can be suppressed (step S504 in FIG. 2).

Figure 2:
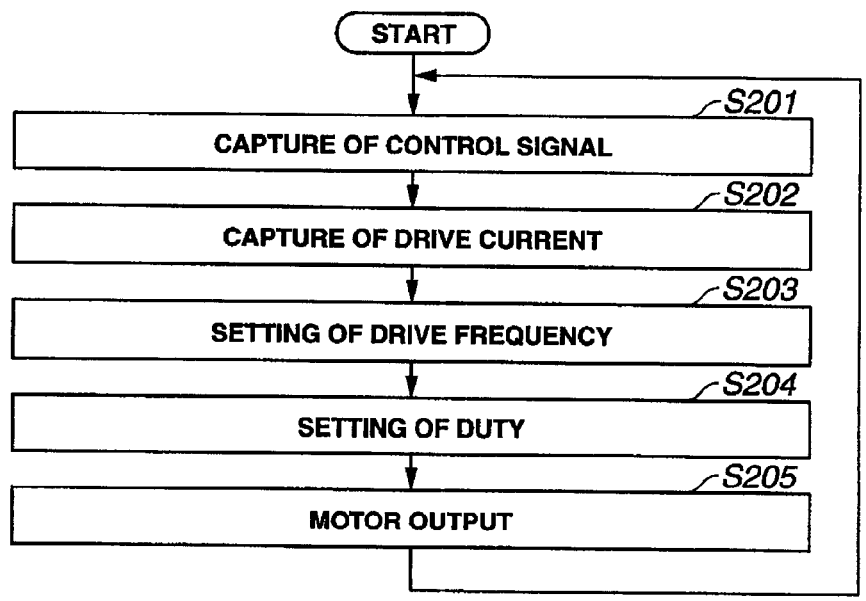
FIG. 2 is a flow chart showing a process of the motor controller according to an embodiment of the present invention.

In the process step S204 in FIG. 2, the duty cycle is set to be a predetermined value or less, based on the control signal and the drive current so as to prevent the excess current from being produced. After the duty cycle of the drive signal is set, the motor 102 is driven with the drive signal (step S205 in FIG. 2). By repeating the previous process, the motor 102 is controllably driven.

In the case where suppression of excess current is not needed, the process step S204 in FIG. 2 is not necessarily required. However, because the control characteristic is changed through changing the duty cycle in the process step S204 in FIG. 2, the manipulation feeling when the controlled equipment is remotely controlled can be changed. The process step S204 in FIG. 2 may be provided if necessary even when it is not necessary to consider suppression of excess current.

The motor controller 101 according to the present embodiment allows the drive control condition to be appropriately changed in response to variations during the drive control of the motor 102. Furthermore, the drive frequency of the drive signal can be controlled and varied automatically and quickly according to variations of the drive current of the motor 102. Moreover, the duty cycle of the drive signal can be controlled and changed automatically such that the motor drive current does not flow excessively.

In the foregoing embodiment, the receiving circuit 103 does not include the motor controller 101 but may include the same.

Moreover, the relationships between drive current and drive signal have been indicated with broken lines but may be plotted with various ways, for example, with curved lines. Also, the motor controller to be used in radio controllers for hobbies has been explained. However, the present invention is applicable to various motor controllers, for example, to industrial remote controllers.

A best mode of the motor controller of the present invention has been explained according to the embodiments. However, the present invention should not be limited to the proposed embodiments. Various other embodiments will be considered within the scope of the technical matters defined in the attached claims.

We claim:

1. A motor controller comprising,
   detection means for detecting a drive current of a motor;
   storage means having loaded therein a table including correlations between drive currents and drive frequencies of said motor; and
   control means for controlling and driving said motor by a drive current in response to a control signal for controlling and driving said motor;
   wherein said control means sets the drive frequency of said drive signal into a drive frequency corresponding to said drive current so as to control and drive said motor, and said control means refers to said table and selects a drive frequency corresponding to a drive current detected by said detection means so as to control and drive said motor in accordance with a drive signal of said drive frequency, and said correlations between drive currents and drive frequencies in said table can be changed.

2. The motor controller according to claim 1, wherein when said motor is a high-power motor, a high-power motor being a motor having a number of winding turns less than thirteen turns, if said drive current is more than a predetermined value, and said control means increases the drive frequency of said drive signal so as to control and drive said motor.

3. The motor controller according to claim 1, wherein when said motor is a low-power motor, a low-power motor being a motor having a number of winding turns of about twenty-three turns, if said drive current is more than a predetermined value, and said control means decreases the drive frequency of said drive signal so as to control and drive said motor.

4. The motor controller according to claim 1, wherein said control means determines the duty cycle of said drive current based on said control signal and based on a drive current detected by said detection means in such a manner that said drive current does not become an excessive current so as to control and drive said motor using said drive signal of said duty cycle.

5. The motor controller according to claim 1, further comprising receiving means for wirelessly receiving and demodulating a modulated control signal and outputting a demodulated signal as said control signal.

* * * * *